UNITED STATES PATENT OFFICE.

JOHN COLLINS CLANCY, OF NEW YORK, N. Y.

PROCESS OF TREATING METALLIFEROUS ORES.

1,010,347.  Specification of Letters Patent.  Patented Nov. 28, 1911.

No Drawing.  Application filed December 27, 1910.  Serial No. 599,443.

*To all whom it may concern:*

Be it known that I, JOHN COLLINS CLANCY, a subject of the King of Great Britain, at present residing in New York city, borough of Manhattan, in the county of New York and State of New York, have invented certain new and useful Improvements in Processes of Treating Metalliferous Ores, of which the following is a specification.

I have discovered that when an amidin compound—such for example as cyanamid—is added to a cyanogen bearing solution—such for example as alkaline ferro cyanid, ferri cyanid, soluble prussian or insoluble prussiates (in fact any of the prussiate family)—that these mixtures are active solvents for the precious metals contained in ores which are amenable to straight cyanid treatment, without the use of electrolysis. Further, this process can be used on ores which have already been treated by the cyanid process, that is to say, on the residues commonly known as dumps. There exists in these dumps a large proportion of Prussian blue, which when treated with alkali becomes in substance potassium ferro and ferri cyanid or soluble prussiates. This opens up a cheap means of treating ores amenable to the ordinary cyanid process, as well as ores such as residues which have already been treated by the cyanid solution:—that is to say, ores in which the precious metals have not been wholly extracted and would not pay for retreatment by the ordinary cyanid process on account of the cost of cyanid; but by my process extremely low grade ores may be advantageously treated by the use of cheap cyanamid of commerce in conjunction with cheap cyanogen bearing material.

The following is an example of using this process upon ore amenable to cyanid treatment:

(1) 2000 pounds of water containing one pound of calcium cyanamid, one pound of alkaline ferro cyanid, one pound of lime. The ore is subjected to this solution in the ordinary way, say in proportion of two parts of solution to one part of ore, for a period of say eight to ten hours, or until extraction is complete.

The following is an example of using the process upon ore which has already been treated by the cyanid process and exposed to atmospheric oxygen, which occasions the formation of Prussian blue and other ferro cyanogen compounds. This ore when treated with a solution containing one pound of cyanamid, one to five pounds of lime, in 2000 pounds of water, gives results equivalent to the use of straight cyanid solution when used in the proportion of two or three parts of solution to one part of ore.

The term "amid" as used herein is intended to include any and all amidin or amidogen bearing compounds.

Having thus described my invention, what I claim as new and desire to secure by Letters Patent is:—

1. The process of treating ore containing precious metals which consists in subjecting ore to the action of amid solution containing a cyanogen bearing compound in a non-electrolyzed solution.

2. The process of treating ore containing precious metals which consists in subjecting ore to the action of a non-electrolyzed cyanamid solution containing a cyanogen bearing compound.

3. The process of treating ore containing precious metals which consists in subjecting ore to a non-electrolyzed cyanamid solution containing a ferro or ferri cyanid compound.

4. The process of treating ore containing precious metals which consists in subjecting ore which contains or is in association with soluble or insoluble prussiates to the action of a cyanamid solution in a non-electrolyzed solution.

In testimony whereof I have signed my name to this specification in the presence of two witnesses.

JOHN COLLINS CLANCY.

Witnesses:
M. E. McNINCH,
C. G. HEYLMAN.

Copies of this patent may be obtained for five cents each, by addressing the "Commissioner of Patents, Washington, D. C."